Patented Sept. 18, 1934

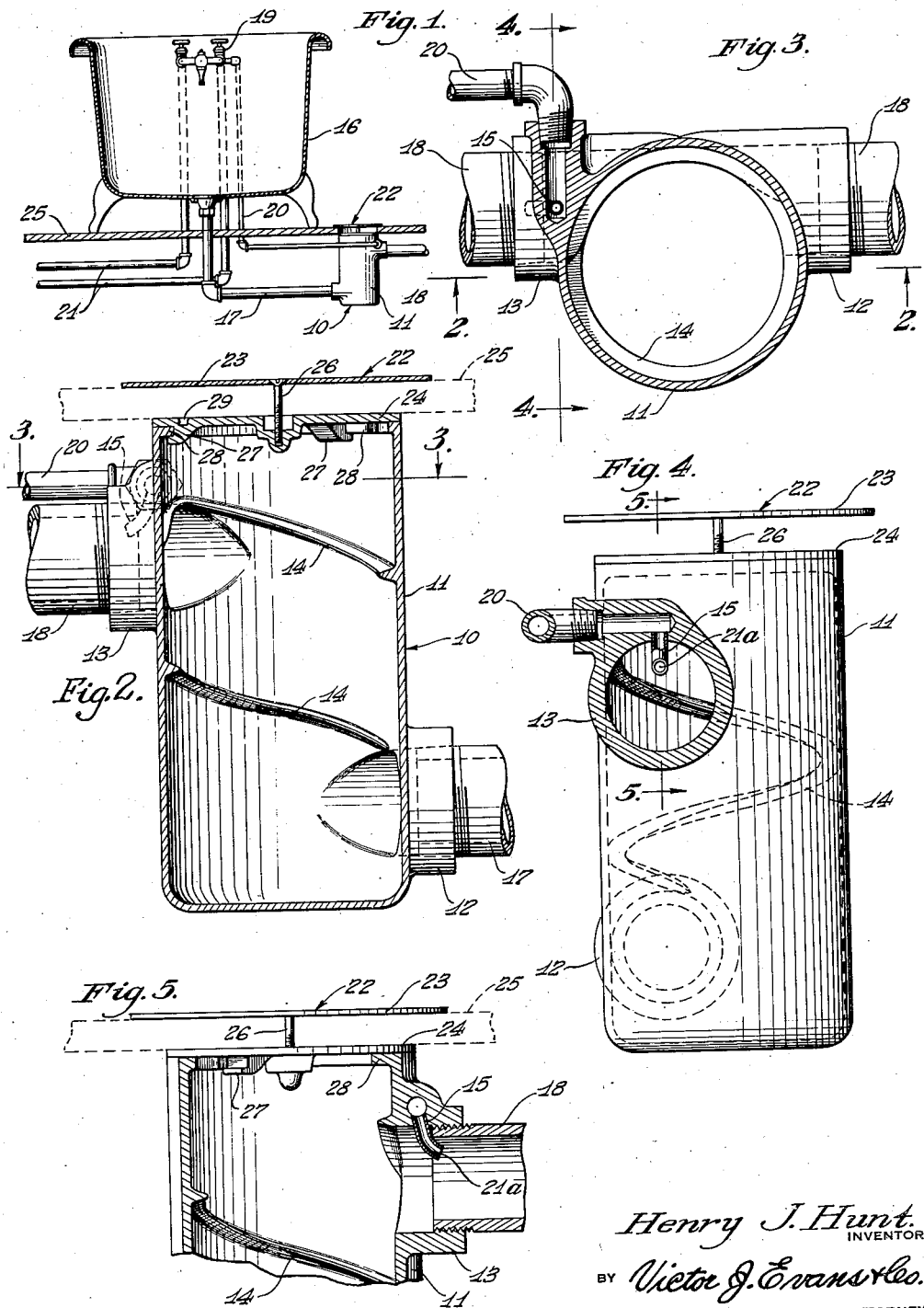

1,974,359

UNITED STATES PATENT OFFICE 1,974,359

TRAP

Henry J. Hunt, Chicago, Ill.

Application April 27, 1932, Serial No. 607,841

2 Claims. (Cl. 182—7)

This invention relates to certain novel improvements in traps, and has for its principal object the provision of an improved construction of this character which will be highly efficient in use and economical in manufacture.

It is an object of this invention to provide an improved trap for association with the drain of fluid receptacles.

Another object of the invention is to construct the trap in such a manner that the rate or speed of fluid flow therethrough will be maintained at a maximum so as to drain in a minimum of time the receptacle with which the trap is associated.

A further object of the invention is to associate with the outlet of the trap a novel conduit for conducting a fluid under pressure to the trap outlet to facilitate fluid flow out of the trap through said outlet, which does not retard the flow and is self-cleaning.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a view, partly in section and partly in elevation, showing one manner of using the invention;

Fig. 2 is a sectional view on line 2—2 of Fig. 3;

Fig. 3 is a view on line 3—3 in Fig. 2, partly in section and partly in top plan;

Fig. 4 is a view on line 4—4 in Fig. 3, partly in section and partly in side elevation; and Fig. 5 is a fragmentary sectional view on line 5—5 in Fig. 4.

In the drawing I have illustrated a preferred form of my invention and therein my improved trap is generally indicated at 10. Said trap comprises a casing 11 having an open upper end with which is associated a closure member or plug 22. At the lower end of the trap casing 11 is a fluid inlet 12 arranged substantially tangentially and above the inlet 12 adjacent the upper end of the trap casing 11 is a similarly arranged fluid outlet 13. Formed on the inner side of the trap casing 11 is a cross-sectionally V-shaped spiral rib 14 which extends in a spiral curve from a point adjacent the inlet 12 to a point adjacent the outlet 13.

Opening into the fluid outlet 13 of the trap casing 11 is an auxiliary fluid inlet 15.

Fig. 1 illustrates one way in which my improved trap may be used and therein a conventional fluid receptacle is illustrated in the form of a bath tub 16 from which a drain conduit 17 leads to the fluid inlet 12 of the trap casing 11. A fluid disposal conduit 18 leads from the fluid outlet 13 of the trap casing 11.

In practising my invention I associate with the fluid controls or faucets 19 of the receptacle 16 so as to be controlled thereby a conduit 20 which communicates at one end with the auxiliary fluid inlet 15 that leads into the fluid outlet 13 of the trap casing 11 and at its other end with a fluid supply conduit 21 for the receptacle 16. This association of the conduit 20 with the controls 19 is such that when a fluid under pressure is delivered by the controls 19 from either of the supply pipes 21 to the receptacle 16 fluid under pressure is also delivered from a supply conduit 21 to the conduit 20 and thence to the auxiliary inlet 15 from which it flows into the outlet 13 of the trap casing whereby the fluid pressure in the outlet conduit 18 is increased and the fluid flow through trap 10 and outlet conduit 18 and the emptying of the receptacle 16 are speeded up.

The trap casing will of course normally be filled with fluid up to the level of outlet 13. As the fluid flows from drain 17 into the trap through inlet 12 it drives the fluid in the trap around the spiral rib 14 which imparts to the fluid being moved out of the trap casing a whirling motion and considerable momentum is thus gained to carry the fluid out through the trap outlet 13 and outlet conduit 18 whereby relatively quick draining of the receptacle 16 is effected even when the level of the fluid in the receptacle 16 and consequent pressure down the drain 17 are low. By reason of the cross-sectionally V-shaped formation of the rib, both its upper and lower faces are at an inclination to a horizontal plane and there is no tendency of foreign matter to remain at rest on the rib.

The discharge end 21a of the auxiliary fluid pressure inlet 15 is directed away from the casing 11 and preferably opens into the outlet 13 in the direction of fluid flow through the outlet 13 whereby the fluid whirled from the spiral rib 14 into the outlet 13 gains additional velocity as it commingles with the fluid under pressure discharged from the auxiliary inlet 15 in the direction in which the fluid emerging from the trap casing 11 is moving out of the outlet 13.

The plug 22 comprises spaced plates 23 and 24 to fit on opposite sides of the floor 25, these plates being interconnected and spaced by a screw 26. On the inner side of the plate 24 are lugs 27 for latching engagement with lugs 28 formed on the inner wall of the casing 11; these lugs 27 and 28 being adapted to be latched and unlatched by a quarter turn of plate 24 so that by unscrewing plate 23 from plate 24 a tool may be inserted into the tool slot or kerf 29 in plate 24 to latch the plate 24 to and unlatch the same from the casing 11 when access thereto is desired.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A waste trap comprising a cylinder having a substantially tangentially arranged inlet adjacent its lower end and a similarly arranged outlet adjacent its upper end effecting a vertically offset continuation of the inlet, the cylinder being provided on its interior wall with a spiral rib of a comparatively limited radial extent, said rib beginning adjacent the top side of the inlet and terminating at the top side of the outlet, whereby the waste flow will be lifted with dispatch from the inlet to the outlet with the movement permitting heavy foreign matter to fall from the flow into the center of the trap for manual removal therefrom, and a cover removably closing the cylinder at the upper end.

2. A waste trap comprising a cylinder having a substantially tangentially arranged inlet adjacent its lower end and a similarly arranged outlet adjacent its upper end effecting a vertically offset continuation of the inlet, the cylinder being provided on its interior wall with a spiral rib V-shaped in cross-section and of a comparatively limited radial extent, said rib beginning adjacent the top side of the inlet and terminating at the top side of the outlet, whereby the waste flow will be lifted with dispatch from the inlet to the outlet with the movement permitting heavy foreign matter to fall from the flow into the center of the trap for manual removal therefrom, and a cover removably closing the cylinder at the upper end.

HENRY J. HUNT.